United States Patent
Williamson et al.

(10) Patent No.: US 10,835,924 B1
(45) Date of Patent: Nov. 17, 2020

(54) HAPTIC TRANSDUCER DEVICE AND INSOLE FOR RECEIVING THE SAME

(71) Applicant: SonicSensory, Inc., Los Angeles, CA (US)

(72) Inventors: Clayton Williamson, Los Angeles, CA (US); Brock Maxwell Seiler, Jefferson Valley, NY (US)

(73) Assignee: SonicSensory, Inc., Los Angeles, CA (US)

( * ) Notice: Subject to any disclaimer, the term of this patent is extended or adjusted under 35 U.S.C. 154(b) by 628 days.

(21) Appl. No.: 15/659,349

(22) Filed: Jul. 25, 2017

Related U.S. Application Data

(60) Provisional application No. 62/366,581, filed on Jul. 25, 2016.

(51) Int. Cl.
*B06B 1/04* (2006.01)
*A43B 3/00* (2006.01)
*H02K 1/34* (2006.01)
*H02K 33/02* (2006.01)
*A43B 17/00* (2006.01)

(52) U.S. Cl.
CPC ............ *B06B 1/045* (2013.01); *A43B 3/0021* (2013.01); *H02K 1/34* (2013.01); *H02K 33/02* (2013.01); *A43B 3/0005* (2013.01); *A43B 17/00* (2013.01)

(58) Field of Classification Search
CPC .......... H02K 1/34; H02K 7/061; H02K 7/063; H02K 7/065; H02K 7/1892; H02K 35/02; A43B 3/0021; A43B 3/0005
USPC ......................................................... 310/81
See application file for complete search history.

(56) References Cited

U.S. PATENT DOCUMENTS

| | | | | |
|---|---|---|---|---|
| 4,506,117 A | * | 3/1985 | Fresard | H04R 9/066 |
| | | | | 381/162 |
| 6,618,487 B1 | * | 9/2003 | Azima | H04R 1/24 |
| | | | | 381/152 |
| 7,372,968 B2 | * | 5/2008 | Buos | H04R 9/066 |
| | | | | 381/152 |
| 9,185,492 B2 | | 11/2015 | Afshar | |
| 2012/0234111 A1 | * | 9/2012 | Molyneux | A43B 3/00 |
| | | | | 73/862.541 |
| 2013/0202134 A1 | | 8/2013 | Afshar | |
| 2019/0082771 A1 | * | 3/2019 | Shin | G01L 1/16 |

* cited by examiner

*Primary Examiner* — Quyen P Leung
*Assistant Examiner* — Minki Chang
(74) *Attorney, Agent, or Firm* — Neal, Gerber & Eisenberg LLP; Michael Kelber; Nawshaba M. Siddiquee

(57) ABSTRACT

Embodiments include a haptic transducer device comprising a magnetic assembly including a yoke and a magnet disposed within an inner cavity formed by the yoke. The device further includes a diaphragm having a top surface, a ledge projecting below and outwards relative to the top surface, and a sidewall extending downwards from the ledge towards the inner cavity. The device also includes a suspension extending concentrically around the diaphragm and including arms extending between inner and outer edges of the suspension, the inner edge being attached to the ledge of the diaphragm and the outer edge being attached to the outer ledge of the yoke. The device further includes a coil attached to the sidewall of the diaphragm and suspended within the inner cavity. One embodiment further includes an attachment groove integrated into the top surface of the diaphragm and configured for receiving attachment structures included on a footwear insole.

21 Claims, 7 Drawing Sheets

HAPTIC TRANSDUCER DEVICE AND INSOLE FOR RECEIVING THE SAME

CROSS-REFERENCE

This application claims the benefit of U.S. Provisional Application Ser. No. 62/366,581, filed on Jul. 25, 2016, the entire contents of which are incorporated by reference herein.

BACKGROUND

Consumers of multi-media entertainment are seeking methods of heightened multi-sensory immersion. Existing systems for providing audio immersion includes use of a subwoofer to feel the low tones of music and to improve the audio of a motion picture or a video game, and the use of surround sound to immerse the user in a more entertaining experience. Aside from audio content, these methods do not provide a multi-sensory stimulation while in a virtual reality or other audio-visual scenario. These methods are exposed in an open environment including multiple stands, wires, and other devices that impart stimuli and are used by more than one person at a time. Furthermore, these methods may be damaging to the ears because they are often pushed too high in volume to create the immersive sound and feeling. Moreover, sub-woofers, in particular, are not convenient for users that prefer experiencing multi-media entertainment while "on the go," as the physical size of sub-woofer devices prevent portability. At the same time, other existing devices, such as conventional earphones, are not capable of providing the same low frequency effect as sub-woofers.

Another area for providing multi-sensory immersion is tactile or haptic stimulation, which can make an entertainment experience even more enjoyable when combined with audio and/or audio-visual immersion. For example, vibrations generated based on audio signals for a musical piece can be synchronized with the audio signals to provide an enhanced music experience where the user both hears and feels the music. Some existing haptic devices, like piezo-electric transducers, are separate from the audio/visual output devices and therefore, require separate components to produce synchronized operation with the rest of the multi-media experience. Other existing haptic devices, such as bass shakers and multifunction transducers, can provide both audio and tactile stimulation but have various drawbacks. For example, most bass shakers have poor dampening characteristics that can cause unpleasant lingering vibrations. Also, most multifunction transducers have predetermined resonant frequencies that are difficult to modify without disassembly.

Accordingly, there is still a need for an improved haptic transducer that can be used to provide a personal multisensory experience while in a virtual reality, surround sound, or other audio-visual scenario, by capturing the energy, vibration, or other immersive stimuli associated with the audio-visual content and delivering the immersive content in synchrony with the audio-visual content to the person of the user.

SUMMARY

Various embodiments of the present disclosure provide a compact haptic transducer device configured to receive electrical signals (e.g., audio and/or haptic signals) from a controller through either a wired or wireless connection. In certain embodiments, the haptic transducer of the present disclosure includes a unique design that allows for a more rugged and durable driver configured to provide haptic feedback to the user through footwear worn by the user. The controller can be in communication with an entertainment system, and the haptic transducer device can be configured to impart a vibration based on an indication of reproduced sound to enhance an entertainment experience. For example, the haptic transducer may dramatically improve the experience of listening to music, watching a movie, or playing a video game.

Embodiments also include an insole configured for receiving the haptic transducer and for placement in a bottom of a piece of footwear, such as a shoe. Embodiments can also include a footwear device for enhancing an entertainment experience by including a haptic transducer mounted to an insole of the footwear, such as a shoe. Placing the haptic transducer into footwear can expand the audio event outside the confines of the head to involve the body, or at least a foot of the user, in an immersive, tactile, and portable experience. In some embodiments, the vibrations simulate force feedback that would resonate from the ground at a live event.

One example embodiment includes a haptic transducer device comprising a magnetic assembly including a yoke, an inner cavity formed by the yoke, and a magnet disposed within the inner cavity; a diaphragm having a top surface, a ledge projecting below and outwards relative to the top surface, and a sidewall extending downwards from the ledge towards the inner cavity; a suspension extending concentrically around the diaphragm and including a plurality of arms extending between an inner edge of the suspension and an outer edge of the suspension, the inner edge being attached to the ledge of the diaphragm and the outer edge being attached to the outer ledge of the yoke; and a coil attached to the sidewall of the diaphragm and suspended within the inner cavity below the suspension.

Another example embodiment includes a haptic transducer comprising a housing comprising an outer ledge surrounding an inner cavity; a diaphragm at least partially positioned within the inner cavity; an attachment groove integrated into a top surface of the diaphragm and configured for receiving attachment structures included on a footwear insole; an annular suspension coupled to the outer ledge of the housing and extending concentrically around the diaphragm; and a coil coupled to the diaphragm and suspended within the inner cavity.

Yet another example embodiment includes an insole for placement in a piece of footwear, the insole comprising a tongue portion comprising raised structures configured for insertion into a groove portion of a haptic transducer for forming a tongue and groove attachment to the haptic transducer, the tongue portion being included on an underside of the insole.

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

Figure 1A:
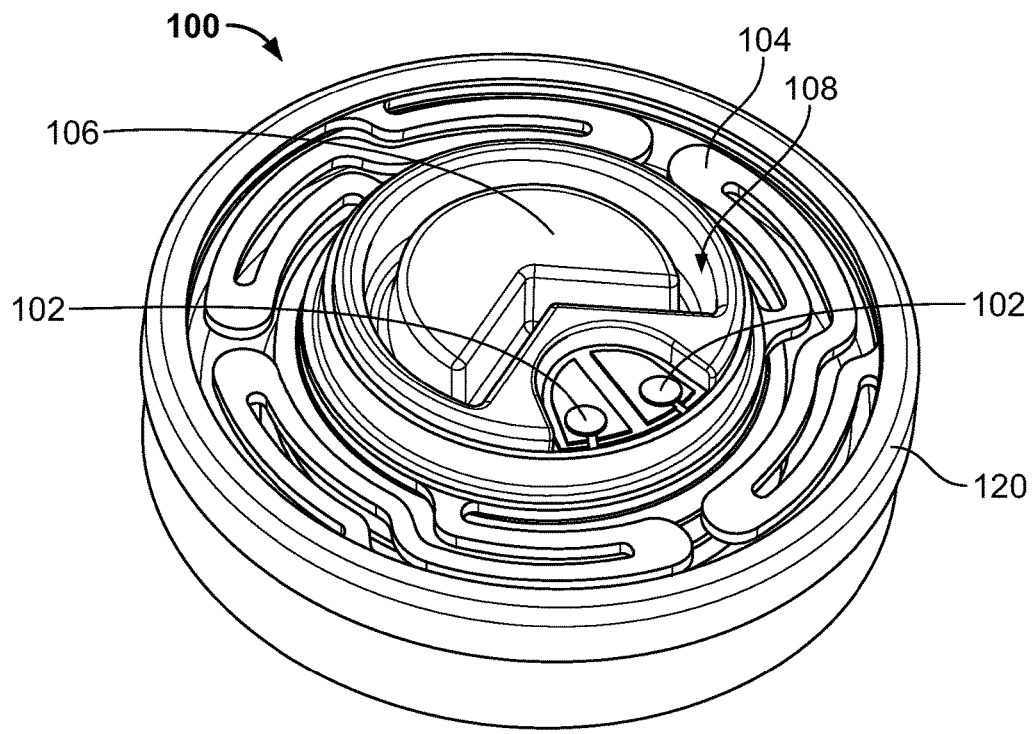
FIG. 1A illustrates a top perspective view of an example haptic transducer in accordance with embodiments.

While the haptic transducer device and insole of the present disclosure may be embodied in various forms, the Figures show and this Specification describes some exemplary and non-limiting embodiments of the haptic transducer device and insole. The present disclosure is an exemplification of the haptic transducer device and insole, and does not limit the system and method of the present disclosure to the specific illustrated and described embodiments. Not all of the depicted or described components may be required, and some embodiments may include additional, different, or fewer components. The arrangement and type of the components may vary without departing from the spirit or scope of the claims set forth herein.

Existing haptic transducer devices or drivers can include a yoke, a magnet, a top plate, a frame or basket, a voice coil, a spider or suspension, and a diaphragm (e.g., a cone or a dome). The diaphragm is supported by the frame and is attached to the coil. The spider is a ring of flexible material that is attached between the frame and the coil and configured to hold the coil in position and dampening oscillations of the coil and the diaphragm, but also allow them to move back and forth freely. The yoke is at the back or bottom of the driver, and the design of the yoke affects the efficiency and stability of the magnet assembly within the motor. The magnet sits above the yoke and is the driving force of the driver. The top plate, together with the yoke and the magnet, completes the magnetic assembly or motor of the driver. Unlike traditional speakers, both the coil and the motor of the haptic transducer are resiliently mounted within the housing and capable of oscillating.

Electrical signals are transmitted to the coil through one or more electrical leads attached to the haptic transducer. The electrical signals may include audio or haptic information. The coil is a basic electromagnet and is suspended in a magnetic field created by the magnetic assembly. Applying electrical signals to the coil causes the coil to move back and forth, like a piston, relative to the magnetic assembly, due to changes in the electromagnet's polar orientation each time the electrical current flowing through the coil changes direction. This movement pushes and pulls on the diaphragm attached to the coil, which causes the diaphragm to vibrate. The coil movement also drives the magnetic assembly to oscillate. In this manner, the coil may serve as an actuator for moving the diaphragm and the magnetic assembly.

Due to its mass and flexible mounting, the magnetic assembly oscillates at a relatively low frequency within the range of frequencies that are easily perceptible to a user. When the coil is excited by signals at a frequency in the resonant frequency range of the transducer, the transducer will vibrate to produce haptic signals. A user can place the transducer in close proximity to the user's body to perceive tactile sensations generated by these haptic signals. In some cases, the haptic signals are transmitted to the user through inertial vibration of an outer housing of the transducer.

Various embodiments of the present disclosure provide a haptic transducer device uniquely configured for mounting to an insole, the insole being designed for placement in a shoe or other footwear. In certain embodiments, the haptic transducer of the present disclosure is configured to provide a compact and rugged driver system that is capable of withstanding pressure from a user, particularly when placed in footwear, while still effectively providing haptic feedback to the wearer. This rugged design is possible due to certain design considerations.

First, the haptic transducer includes fixed electrical leads for receiving the electrical signals and providing a more rugged electrical connection, rather than the flexible leads that are found in conventional haptic transducers and are prone to mechanical failure. Second, the haptic transducer includes a "razorback" or winding spider configured to more evenly distribute stresses across the spider, provide a more compact form factor for the transducer, and provide a larger range for safe excursion. Third, the haptic transducer includes a floating motor and a floating coil, which allows for dual modes of operation depending on the amount of pressure applied to the haptic transducer device, for example, by the user's foot when worn within a shoe. Fourth, the haptic transducer can be configured for attachment to the insole through a tongue and groove connection that is designed to maximize the amount of surface area on the haptic transducer that is in contact with, and imparting vibrations to, the insole, and to provide a secure and simple connection that allows for rotational and axial alignment between the insole and the device. A fifth feature of the haptic transducer of the present disclosure is an offset dome configured to reduce stresses on and increase excursion of the spider, which provides for greater reliability and durability than most larger drivers.

Figure 1B:
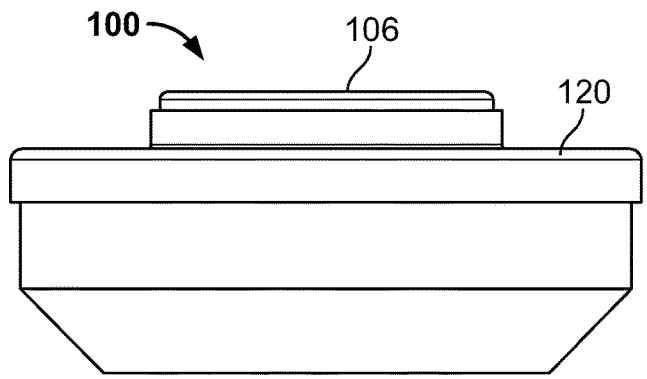
FIG. 1B illustrates a side view of the haptic transducer of FIG. 1A in accordance with embodiments.
Figure 1C:
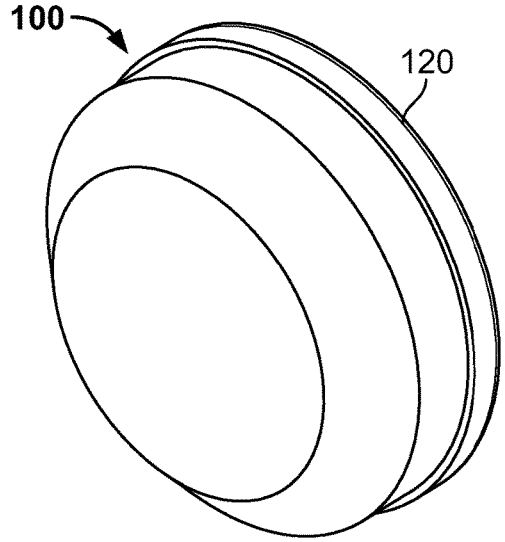
FIG. 1C illustrates a bottom perspective view of the haptic transducer of FIG. 1A in accordance with embodiments.

FIGS. 1A-1G illustrate multiple views of an example haptic transducer device 100 in accordance with embodiments. FIG. 1A illustrates a top perspective view of the haptic transducer 100. FIGS. 1B and 1C provide side and bottom perspective views, respectively, of an outer housing of the haptic transducer 100. As shown, the haptic transducer 100 includes a pair of fixed leads 102, a spider 104, and a diaphragm 106.

Figure 1D:
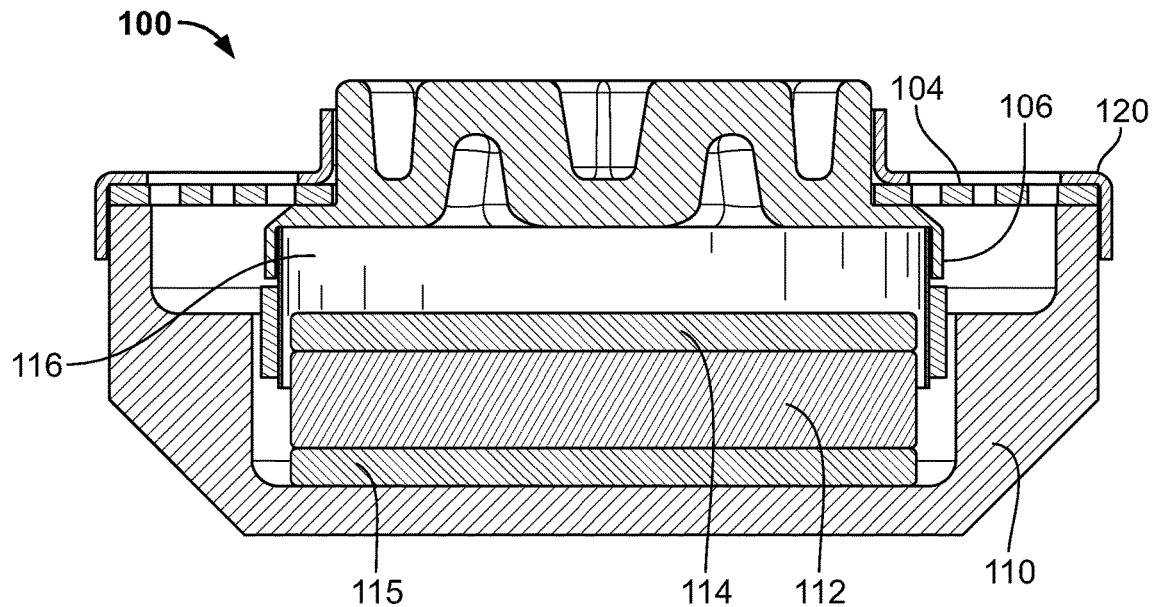
FIG. 1D illustrates a cross-sectional view of the haptic transducer of FIG. 1B in accordance with embodiments.
Figure 1E:
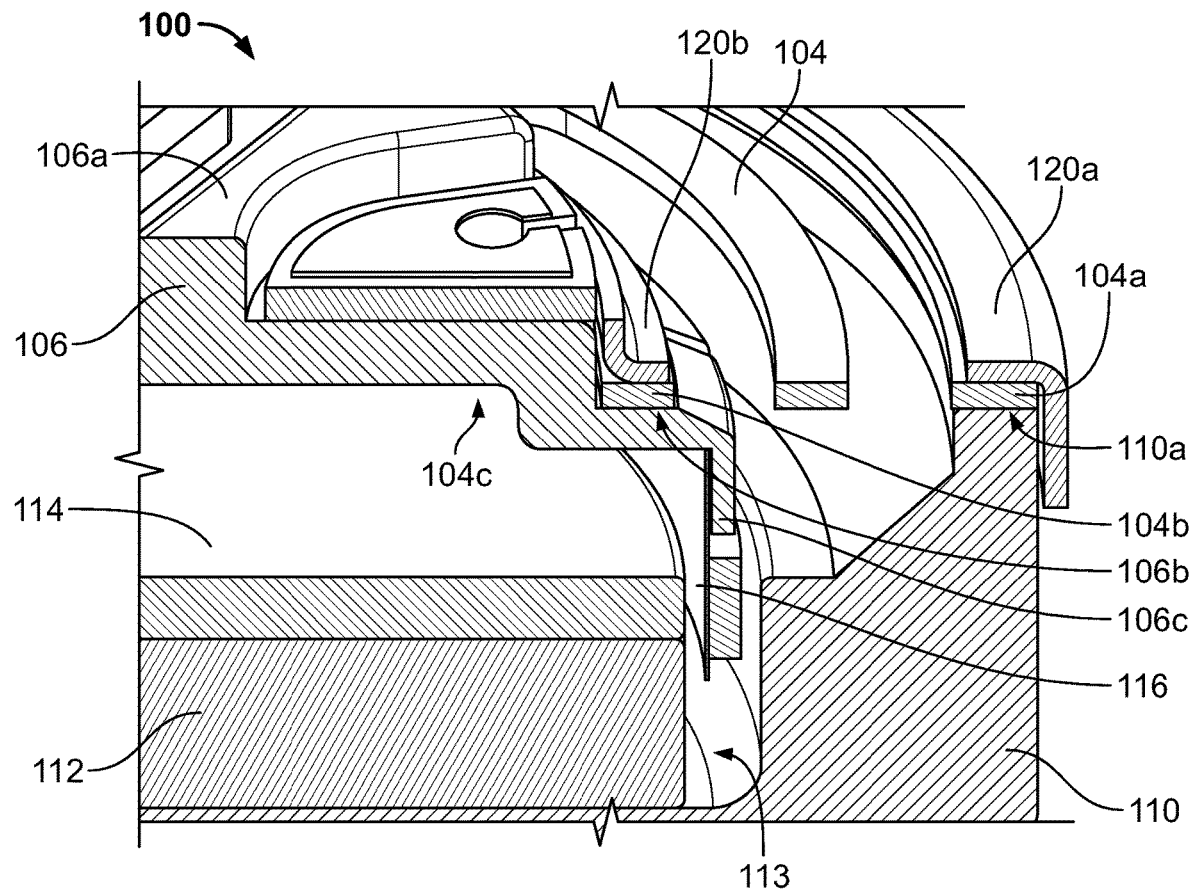
FIG. 1E illustrates a partial, close-up cross-sectional view of the haptic transducer of FIG. 1D, in accordance with embodiments.

As shown in the cross-sectional views of FIGS. 1D and 1E, the diaphragm 106 is generally bell-shaped but with a stepped configuration comprised of a dome-like top portion coupled to a flared lower portion. The dome-like top portion includes a substantially flat top surface 106a and a first sidewall that extends downwards from, and substantially perpendicular to, the top surface 106a. The flared lower portion includes an inner ledge 106b that extends outwards from, and substantially perpendicular to, the first sidewall, and a second sidewall 106c that extends downwards from, and substantially perpendicular to, the inner ledge 106b. As shown, the inner ledge 106b (also referred to herein as a "ledge") projects or flares out from a bottom of the top portion, such that the ledge 106b projects outwards relative to, and is positioned vertically below, the top surface 106a. The ledge 106b then curves or steps downwards to form the second sidewall 106c (also referred to herein as a "sidewall"), which extends down towards and into the inner cavity of the haptic transducer 100. In embodiments, an overall height of the diaphragm 106 (e.g., a height of the first sidewall plus a height of the second sidewall 106c) may be selected based on the maximum excursion, or vertical movement, of the driver, or in order to provide enough room for such excursion without collision.

The spider 104 is attached to the ledge 106b of the diaphragm 106. As shown in the top view of FIG. 1G, the spider 104 has a generally annular shape that extends concentrically around the diaphragm 106. In certain embodiments, the spider 104 is attached to the diaphragm 106 by glue or other adhesive material.

As shown in FIG. 1A, the top surface 106a of the diaphragm 106 (also referred to herein as a "dome") provides a housing or mounting surface for the fixed leads 102. The dome 106 also includes an attachment groove 108 integrated into the top surface 106a of the dome 106 and centered on the dome 106. This built-in attachment groove 108 can be configured to form a grove portion of a tongue and grove connection between the transducer 100 and a footwear insole, as described in more detail herein with respect to FIGS. 2A-2C. When placed in a shoe, for example, a bottom surface of the haptic transducer 100 faces a bottom of the shoe and the top surface 106a of the transducer 100 can face and be attached to an underside of the insole, such that the transducer 100 is positioned between the insole and the shoe. In embodiments, the dome 106 may be made of plastic or other non-magnetic material.

As better illustrated by the cross-sectional views in FIGS. 1D and 1E, the transducer 100 also includes a yoke 110 that forms the bottom surface and side walls (or lower housing) of the haptic transducer 100. As shown, an outer ledge 110a of the yoke 110 extends around a perimeter of the yoke 110 to support or attach to the spider 104. A magnet 112 is positioned within an inner cavity 113 or center of the yoke 110, which is surrounded by the outer ledge 110a, as shown in FIG. 1D. A top plate 114 sits above the magnet 112. In embodiments, the yoke 110, the magnet 112, and the top plate 114 can make up a magnetic assembly, or motor, of the transducer 100. In some embodiments, the magnetic assembly further includes a bottom plate 115 positioned between the magnet 112 and the yoke 110.

As shown, the yoke 110 serves as, at least part of, an outer housing for the transducer 100. In some embodiments, an overall diameter of the transducer 100 is determined by, or substantially equal to, an overall diameter of the yoke 110. The yoke 110 can also serve as the frame or basket of the transducer 100. For example, conventional transducers use a separate frame piece to locate the motor (i.e. the magnet, top plate, yoke, and pedestal) relative to the moving suspension and diaphragm assembly. In the illustrated embodiment, the yoke 110 is configured to support the suspension-diaphragm assembly (e.g., via the connection between the spider 104 and the outer ledge 110a of the yoke 110), which eliminates the need for a separate frame in the transducer 100. The frame-less design of the transducer 100 reduces manufacturing costs (e.g., due to the removal of the frame piece) and simplifies assembly of the transducer 10. The frame-less design also increases durability by removing the possibility of failure modes tied to the frame (e.g., the plastic frame piece weakening with heat) or the bonding of the frame to other components.

As shown in FIG. 1D, the transducer 100 further includes a coil 116. In some embodiments, the coil 116 can include a length of wire (e.g., copper wire) wound around a core to form a traditional electromagnet. In other embodiments, the coil 116 can be an etched coil formed by printing or etching wire windings directly onto a flexible material (e.g., metallic ribbon). In the illustrated embodiment, the coil 116 has a generally annular shape, and a top end of the coil 116 is coupled to the downward-extending, lower sidewall 106c of the dome 106. As shown, the coil 116 can be coupled to an inside of the sidewall 106c. In other embodiments, the coil 116 may be attached to an outside of the sidewall 106c (not shown). As illustrated in FIGS. 1D and 1E, the coil 116 forms a generally flat surface or sidewall that extends downwards from the dome 106 into the inner cavity 113 and towards the top plate 114. The coil 116 also extends concentrically around the top plate 114 and the magnet 112.

In embodiments, placement, as well as sizing, of the coil 116 can be configured to avoid contact with the pieces of the magnetic assembly. For example, as shown, only the top end of the coil 116 may be attached to another surface (i.e. the sidewall 106c of the dome 106), so that a bottom portion of the coil 116 is suspended or floating between the sidewalls of the yoke 110 and the magnet 112, or within the magnetic gap formed thereby. In embodiments, the attachment or joint between the dome 106 and the coil 116 along the sidewall 106c is concealed by, or positioned under, the spider 104. As a result, the attachment point can travel into, or be disposed within, the magnetic gap. This configuration can prevent the coil 116 from limiting the excursion of the motor. For example, in a conventional transducer, the joint between the dome and the coil typically provides a hard stop that collides with the yoke and thus, limits the excursion of the motor. In one example embodiment, the transducer 100 can be made approximately two millimeters thinner by fully immersing the joint between the coil 116 and the dome 106 within the gap formed between the yoke 110 and the magnet 112.

In various embodiments, the motor, which includes the yolk 110, the magnet 112, and the top plate 114, is also configured to be floating, at least relative to the coil 116. The floating motor is achieved by coupling only the outer ledge 110a of the yoke 110 to the outer diameter of the spider 104 and by coupling the inner diameter of the spider 104 to the ledge 106b of the dome 106. Thus, the motor is not connected to the coil 116 and can move independently of the coil. By contrast, in conventional haptic transducers, the coil is attached directly to the yoke, or the pole piece included in the yoke, and to the spider, such that the motor is not free to move relative to the coil.

In embodiments, the floating motor and the floating coil 116 enable the transducer 100 to have two modes of operation when attached to a footwear insole and worn by the user. The first mode of operation can be initiated when only light pressure is applied to the transducer 100 (e.g., by the foot of the user) and therefore, the coil 116 is still free to move within the space between the magnet 112 and the yoke 110. The second mode of operation can be initiated when heavy pressure is applied to the transducer 100 and therefore, the coil 116 is no longer free to move, but the motor of the transducer 100 is still free to move relative to the insole. This option for dual operational modes allows for a more efficient use of transducer resources and helps improve durability and reliability of the transducer 100.

Moreover, the transducer 100 is designed such that a center of gravity of the moving parts within the transducer 100 is aligned with a central axis of the coil 116, and a majority of the mass included in the transducer 100 is positioned below the coil 116, such as, for example, the magnet 112, the plates 114 and 115, and a bottom portion of the yoke 110, as shown in FIG. 1D. As a result, as the floating motor moves up and down within the transducer 100 during operation, the movement is more evenly distributed along a central axis of the transducer 100, thereby avoiding, or reducing the tendency for, side to side movement, such as, e.g., rocking, tilting, or pendulum motion. This increased stability is at least partially due to the frameless design of the transducer 100, which helps move the center of gravity of the motor closer to the central axis of the coil.

As shown in FIG. 1D, the spider 104 (also referred to herein as a "suspension") is positioned above the coil 116 and the magnetic assembly of the haptic transducer 100. As also shown, the spider 104 is coupled between the ledge 106b of the dome 106 and the outer edge 110a of the yoke 110. In embodiments, this spider design helps provide the haptic transducer 100 with several advantageous improvements over conventional haptic transducer designs. For example, in a conventional haptic transducer, the diaphragm is attached to an outer diameter of the frame, and the spider is attached between an inner diameter of the frame and the coil, such that the overall diameter of the transducer is determined by the outer diameter of the frame/diaphragm. In the illustrated embodiments, the frame is removed, and instead, an outer diameter of the yoke 110 determines the overall diameter of the transducer 100. In addition, the diaphragm or dome 106 has an offset design, relative to the driver. In particular, the dome 106 is configured to have a diameter that is smaller than an overall diameter of the transducer 100 by coupling the spider or suspension 104 between the ledge 106b of the dome 106 and the outer edge 110a of the yoke 110. Also, the ledge 106b of the dome 106 is configured to have an inner diameter that is smaller than a diameter of the coil 116, and the lower sidewall 106c of the dome 106 is configured to extend just outside of the coil 116, such that an overall diameter of the dome 106 overlaps with, or exceeds, the diameter of the coil 116. This configuration of the spider 104, the coil 116, and the offset dome 106 helps achieve dual goals of keeping an overall diameter of the transducer 100 as small as possible to obtain a smaller overall form factor, and creating a larger distance or clearance between an outer edge 104a and an inner edge 104b of the spider 104 for improved coil operation.

Figure 1F:
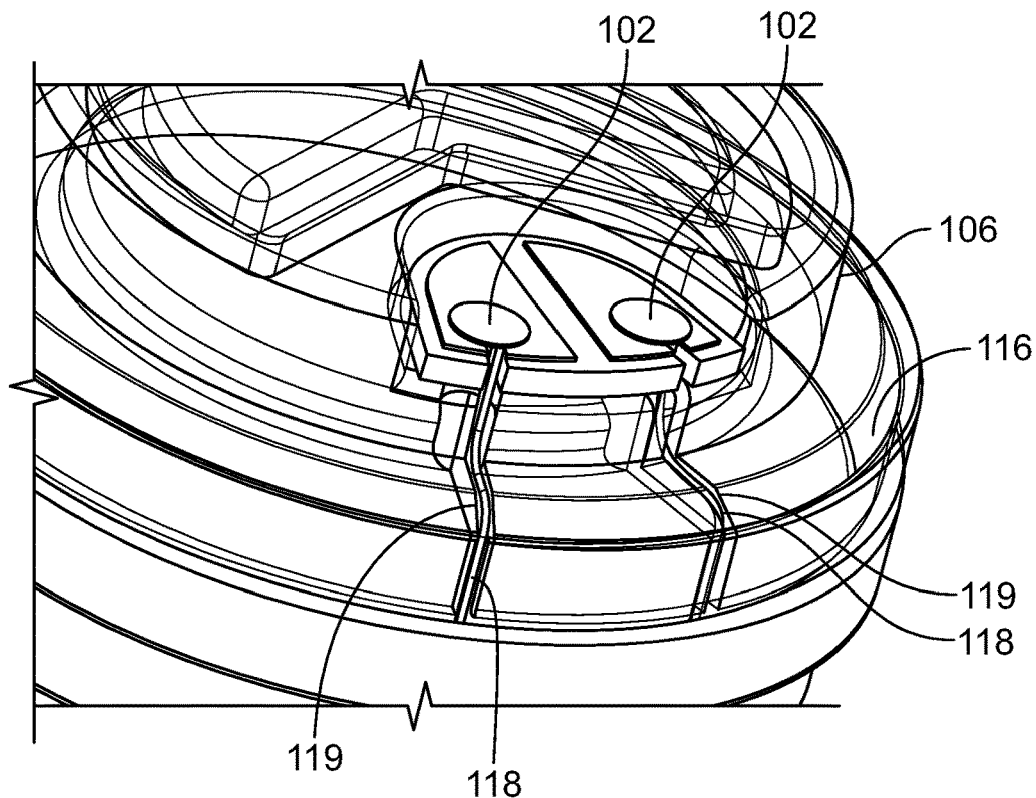
FIG. 1F illustrates a top perspective view of example electrical leads included in the haptic transducer of FIG. 1A, in accordance with embodiments.
Figure 1G:
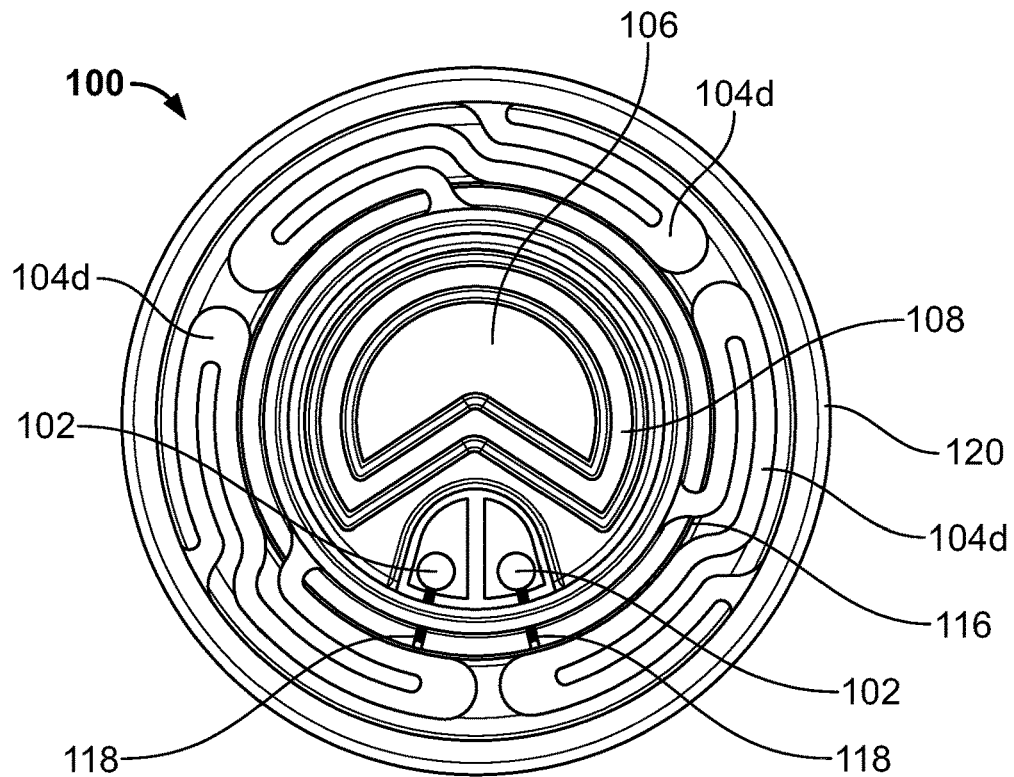
FIG. 1G illustrates a top view of the haptic transducer of FIG. 1A in accordance with embodiments.

As shown in FIG. 1G, the spider 104 can be configured to have a generally annular shape with a "razorback" or winding design formed by a plurality of arms or ribs extending between the outer spider edge 104a and the inner spider edge 104b. The inner edge 104b of the spider 104 forms an open center 104c, and a top portion of the dome 106 extends through the open center 104c of the spider 104. In embodiments, the spider 104 can be composed of any suitable flexible but sturdy material (e.g., metal or plastic) that is capable of withstanding or absorbing the stresses applied thereto. As shown in FIG. 1E, the inner edge 104b of the spider 104 is positioned on and attached to the ledge 106b of the dome 106 and has a width configured to substantially match a width of the ledge 106b of the dome 106. Likewise, the outer edge 104a of the spider 104 is positioned on and attached to the outer ledge 110a of the yoke 110 and has a width configured to substantially match a width of the outer ledge 110a of the yoke 110. In embodiments, the spider 104 is configured (e.g., sized and shaped) to make these two attachment areas as narrow as possible while still creating a sturdy contact with the respective surfaces. By making the attachment areas narrower, the remaining, winding portions of the spider 104 can be made wider, thus providing a larger surface area for absorbing the stresses applied to the spider 104.

For example, as shown in FIGS. 1E and 1G, the arms 140d of the spider 104 form a series of curved extensions that float horizontally in the space between the dome 106 and the yoke 110. By curving back and forth within this space, the arms 104d (also referred to as "windings") increase an overall surface area for the spider 104. In the illustrated embodiment, the spider 104 is comprised of three arms 104d, each arm 104d having one end attached to, or extending from, the outer spider edge 104a and the other end attached to, or extending fro, the inner spider edge 104b. In FIG. 1G, each arm 104d includes two floating extensions or curved portions that are formed by winding or zigzagging back and forth to fill the horizontal space between the ledge 106b of the dome 106 and the outer ledge 110a of the yoke 110. In other embodiments, each arm 104d of the spider 104 may include fewer extensions or windings, for example, as shown in FIGS. 3B and 4B, or more windings than that shown in FIG. 1G. In some embodiments, the spider 104 may include fewer or more than the three arms 104d illustrated herein.

A conventional transducer would require a much larger diameter to achieve the same level of performance as the transducer 100, including accommodating the larger moving mass and the higher amount of stress resulting therefrom. The several windings of the spider 104 can reduce an overall stress on the spider 104 by more evenly distributing the applied stress across a larger surface area, thus improving the durability of the transducer 100 and resulting in a larger range of safe excursion for the transducer 100. The winding design of the spider 104 also helps maintain a compact form factor for the overall transducer 100, as it allows a diameter of the coil 116 and an outer diameter of the yoke 110 to be close together, or substantially overlap.

In embodiments, the size, shape, and configuration of the spider 104 can be selected in view of a number of design considerations, in addition to or along with those discussed above. For example, to provide a haptic transducer with a compact design that is capable of fitting within the insole of a shoe, it is important to keep an overall outer diameter of the spider 104 as small as possible. However, to provide a suspension 104 capable of sturdy stress management for the transducer 100, it is also important to provide sufficient surface area between the inner spider edge 104b and the outer spider edge 104a to absorb the stresses placed on the transducer 100. Furthermore, maintaining an appropriately large distance, or clearance, between an inside diameter of the spider 104, or formed by the inner spider edge 104b, and an outside diameter of the spider 104, formed by the outer spider edge 104a, is critical for magnetic efficiency and stability, speaker sensitivity, and power handling, and is easier for production and quality control. For example, this clearance provides the space required for allowing proper coil operation without contacting the magnetic assembly. However, if the coil gap is too large, the transducer 100 will not perform as well due to low magnetic field strength and poor heat dissipation.

FIGS. 1A and 1G depict an exterior of the transducer 100 and show that the electrical leads 102 are accessible for electrical connection from the exterior of the transducer 100. Each of the electrical leads 102 can be a metal contact pad disposed or positioned on the top or external surface 106a of the dome 106 in order to facilitate forming an electrical connection with an external signal source. For example, electrical signals can be applied to the coil 116 by electrically connecting the leads 102 to a controller, a media player, a wireless receiver, or other external signal source. FIG. 1F depicts the haptic transducer 100 with the dome 106 drawn in phantom or transparent lines, in order to show that each electrical lead 102 is internally connected to the coil 116 via a respective one of the electrical wires 118. The dome structure 106 includes internal channels or slots 119 configured to securely receive or house the electrical wires 118 therein as they travel from the leads 102 to the coil 116, thus providing fixed electrical connections between the two. The channels 119 may be carved into, or formed within, a portion of the top surface 106a, the ledge 106b, the sidewall 106c, and/or other parts of the diaphragm 106 that fall within the pathway from the leads 102 to the coil 116.

The fixed leads 102 of the present disclosure provide several advantageous improvements over conventional haptic transducers. For example, in conventional transducers, the electrical leads are encased in a rigid structure but form electrical connections with the coil that are designed to flex and/or move along with the driver motion. As a result, conventional leads are connected to the driver using glue and solder materials that are carefully selected to provide an appropriate amount of flex. However, such movement of the leads allows for failures. And due to the flexible nature of these electrical connections, the flex leads can form the weakest point of the conventional driver. The present disclosure removes these design considerations and concerns by fixedly attaching the electrical leads 102 to the coil 116 via the channels 119 for receiving the electrical wires 118 and by providing metal contact pads 102 on an external surface of the transducer 100 for receiving electrical signals, thereby allowing for a more rugged connection between the coil 116 and the external signal source.

The fixed electrical leads 102 also remove the need for a frame. In conventional haptic transducers, the frame is needed to allow passage of the electrical leads there through, the electrical leads being accessible from an external surface of the frame. In the haptic transducer 100 of the present disclosure, the dome 106 serves this function without the frame by including a platform for receiving the electrical leads 102 on the top surface 106a of the dome 106.

In some embodiments, the transducer 100 can further include a top cover 120 configured to mechanically secure the spider 104 to the driver. In conventional haptic transducers, a weight of the moving mass within the driver is relatively low, such as, e.g., 1 gram (g), and therefore, a glue or other adhesive is sufficient to secure the spider to the frame. In the present disclosure, the weight of the moving mass within the driver is much heavier (e.g., 80-100 g) and therefore, adhesive may not be enough to secure the spider 104 to the dome 106 and/or yoke 110, or prevent the spider 104 from flying off during oscillation of the driver. Accordingly, in addition to gluing the spider 104 to the dome 106 and/or the yoke 110, the top cover 120 can be added to keep the spider 104 in place. In some embodiments, the top cover 120 can have a two-piece construction to reinforce the connection to the spider 104 on both the outside and inside. For example, as shown in FIG. 1E, the top cover 120 may include an outer collar 120a disposed around an outer perimeter of the transducer 100 to secure the outer edge 104a of the spider 104 to the outer ledge 110a of the yoke 110. The top cover 120 may also include an inner collar 120b disposed around the diaphragm 106 for securing the inner edge 104b of the spider 104 to the ledge 106b of the diaphragm 106, as also shown in FIG. 1E.

Figure 2A:
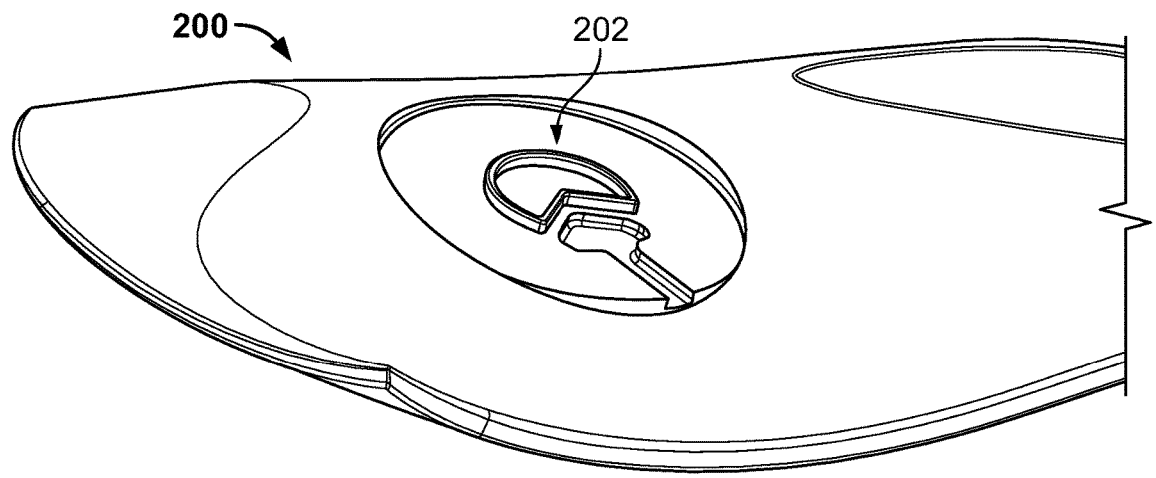
FIG. 2A illustrates a bottom perspective view of an example shoe insole configured to receive the haptic transducer of FIG. 1A in accordance with embodiments.
Figure 2B:
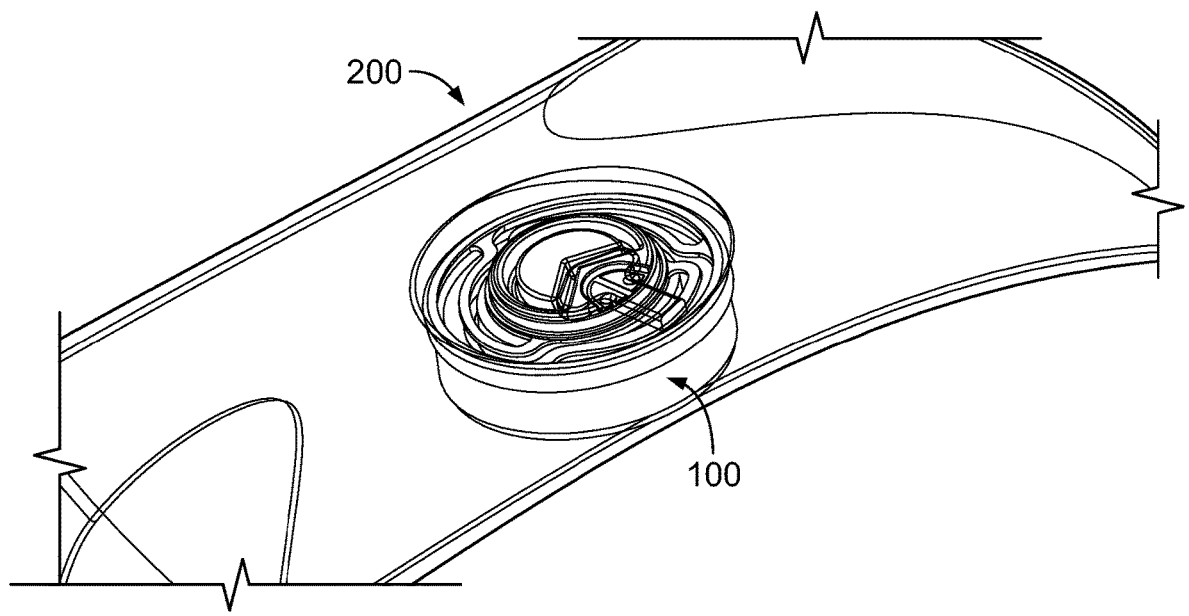
FIG. 2B illustrates a partially transparent, top perspective of the insole of FIG. 2A coupled to the haptic transducer of FIG. 1A in accordance with embodiments.
Figure 2C:
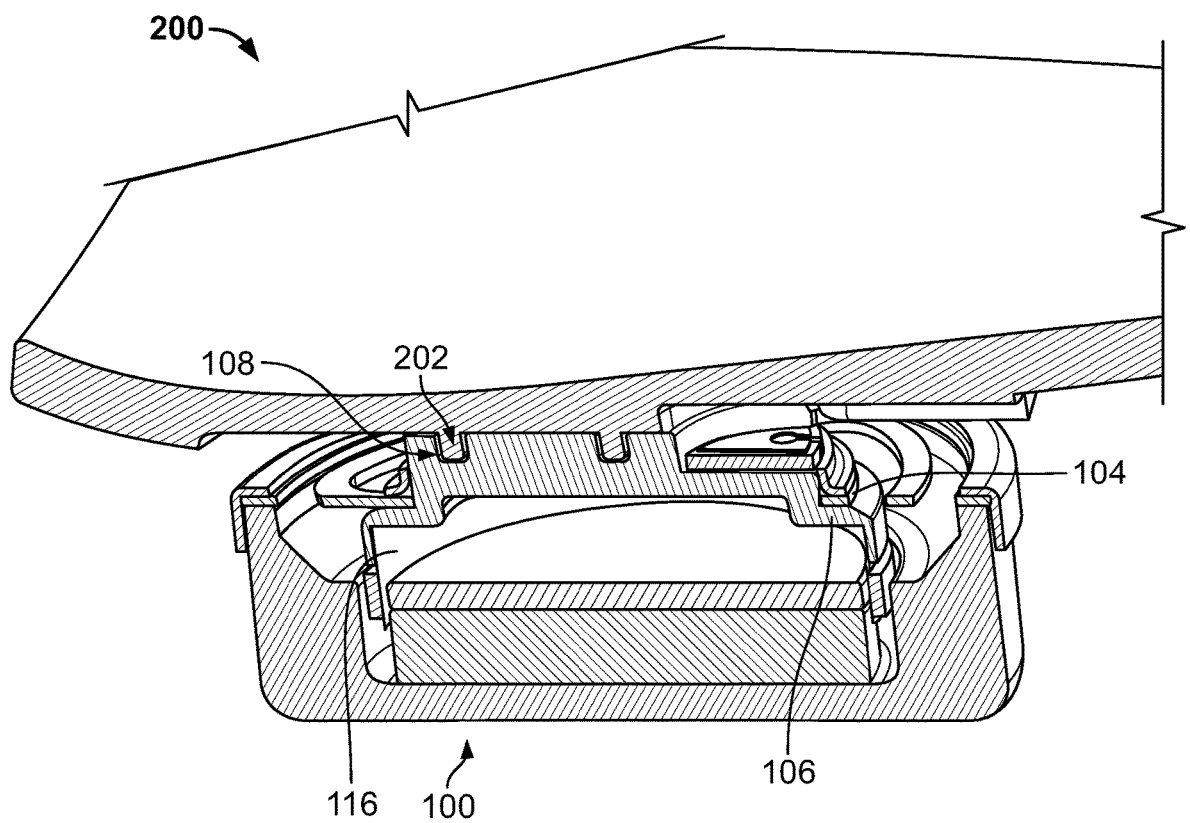
FIG. 2C illustrates a cross-sectional view of the insole and haptic transducer shown in FIG. 2B in accordance with embodiments.

Turning now to FIGS. 2A-2C, shown is an example insole 200 configured for connection to the haptic transducer 100 and for placement in a piece of footwear. In embodiments, the insole 200 (also referred to herein as "footwear insole") includes a tongue portion 202 on an underside of the insole 200 that is configured to form a tongue and groove connection with the attachment groove 108 of the dome 106 of the transducer 100. The tongue portion 202 is visible in FIG. 2A, which depicts a bottom perspective view of the shoe insole 200 without the haptic transducer 100 in place. FIG. 2B depicts a top perspective view of the shoe insole 200 coupled to the haptic transducer 100, the insole 200 being drawn partially transparent in order to show the transducer 100 coupled to the underside of the insole 200. FIG. 2C depicts a cross-sectional view of the shoe insole 200 and the haptic transducer 100 inserted into the tongue portion 202 of the insole 200.

As shown, each of the insole 200 and the dome 106 can include a combination of depressions and raised edges that are configured to interconnect when the attachment groove 108 on the top surface of the transducer 100 is inserted into the tongue portion 202 of the insole 200, or vice versa. For example, as illustrated in FIG. 2C, the tongue portion 202 includes protrusions or raised structures that extend down vertically from the underside of the insole 200 and are configured to fit into, or be received by, the attachment groove 108 on the top surface of the transducer 100.

In a preferred embodiment, an adhesive is also applied to one or more of the transducer 100 and/or the shoe insole 200 to further secure the connecting surfaces together. In certain embodiments, the adhesive is loaded in shear, rather than in tension, to provide a more reliable bond between the tongue portion 202 and the attachment groove 108.

Thus, the tongue and groove connection of the present disclosure provides the haptic transducer 100 with a fastener-less attachment or integrated mounting technique. Moreover, due to the pre-configured structures and depressions included therein, the tongue and groove connection enables precise rotational and axial alignment during installation of the haptic transducer 100, thereby enabling easy and reliable assembly of the transducer 100 with the insole 200. For example, the attachment groove 108 can be centered on the top surface of the transducer 100. Further, the tongue portion 202 can be positioned on the insole 200 so as to maximize the haptic effect of the transducer signals. The tongue and groove connection also provides a large surface area for attaching the haptic transducer 100 to the insole 200, thus increasing a contact area between the insole 200 and the driver. As will be appreciated, the vibrations or haptic signals generated by the haptic transducer 100 can be transferred to the insole 200, and thereby, to the foot of the user, via this contact area. At the same time, the tongue and groove connection can be configured to leave a space between the underside of the insole 200 and the spider 104 of the transducer 100, so that the driver has enough room to oscillate during operation. For example, the structures included on the underside of the insole 200 can be sized and shaped to avoid contact with the spider 104 or otherwise extend too far past the top of the diaphragm 106.

In embodiments, the insole 200 coupled to the haptic transducer 100 forms a unitary piece configured for insertion into any suitable piece of footwear, including shoes, sandals, etc. In some embodiments, this unitary piece (also referred to herein as a "vibrating insole") is included in a footwear device configured for enhancing an entertainment experience (e.g., a video game, a movie, a musical piece, etc.), and/or an entertainment system for use therewith, such as, for example, the vibrating footwear device and entertainment system described in co-owned U.S. Pat. No. 8,644,967, the contents of which are incorporated by reference herein in its entirety.

Figure 3A:
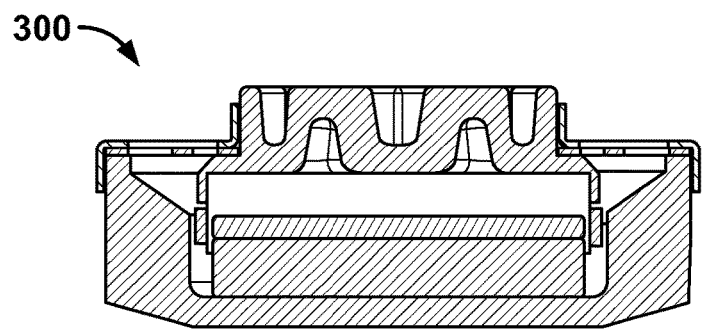
FIG. 3A illustrates a cross-sectional view of another example haptic transducer in accordance with embodiments.
Figure 3B:
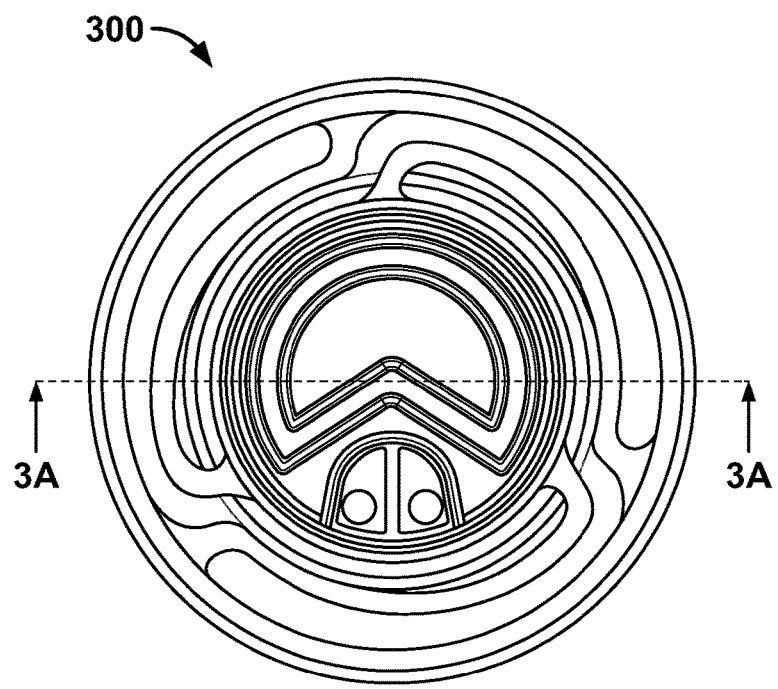
FIG. 3B illustrates a top view of the haptic transducer of FIG. 3A in accordance with embodiments.
Figure 3C:
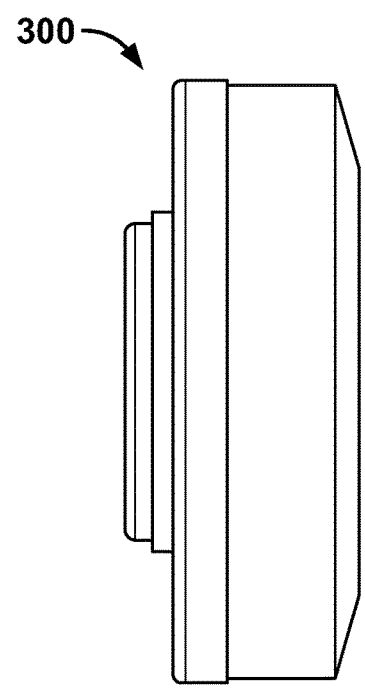
FIG. 3C illustrates a side view of the haptic transducer of FIG. 3C in accordance with embodiments.
Figure 4A:
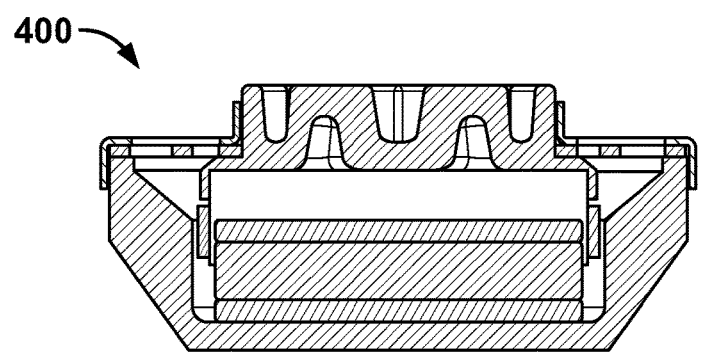
FIG. 4A illustrates a cross-sectional view of another example haptic transducer in accordance with embodiments.
Figure 4B:
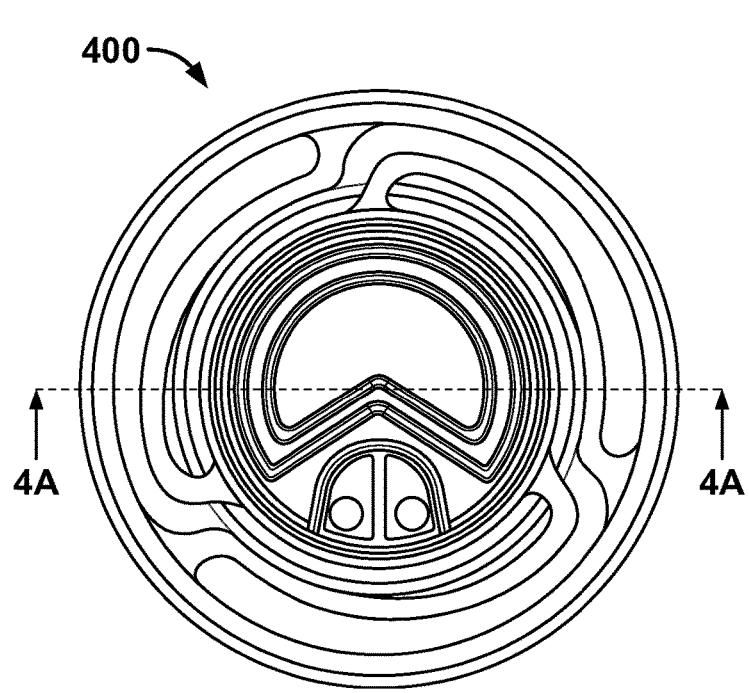
FIG. 4B illustrates a top view of the haptic transducer of FIG. 4A in accordance with embodiments.
Figure 4C:
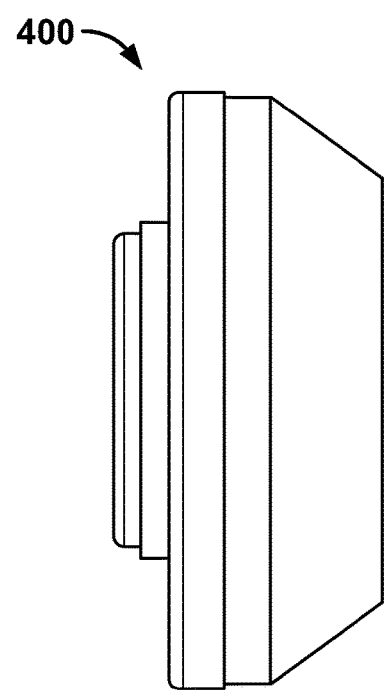
FIG. 4C illustrates a side view of the haptic transducer of FIG. 4A in accordance with embodiments.

FIGS. 3A-3C illustrate various views of another example haptic transducer 300, in accordance with embodiments. The haptic transducer 300 has dimensions of approximately 40 mm by 18.4 mm. FIGS. 4A-4C illustrate various views of yet another example haptic transducer 400, in accordance with embodiments. The haptic transducer 400 has dimensions of approximately 40 mm by 15.7 mm. While the overall shapes of the transducers 100, 300, and 400 may differ, the functional, operational, and structural characteristics of the transducers 300 and 400 may be substantially the same as that of the transducer 100 described herein. Thus, for the sake of brevity, the transducers 300 and 400 will not be described in further detail.

Any process descriptions or blocks in the figures, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A haptic transducer device, comprising:
 a magnetic assembly including a yoke, an inner cavity formed by the yoke, and a magnet disposed within the inner cavity;
 a diaphragm having a top surface, a ledge projecting below and outwards relative to the top surface, and a sidewall extending downwards from the ledge towards the inner cavity;
 a suspension extending concentrically around the diaphragm and including a plurality of arms extending between an inner edge of the suspension and an outer edge of the suspension, the inner edge being attached to the ledge of the diaphragm and the outer edge being attached to the outer ledge of the yoke;
 a coil attached to the sidewall of the diaphragm and suspended within the inner cavity below the suspension; and
 an attachment groove integrated into the top surface of the diaphragm and configured for receiving attachment structures included on a footwear insole.

2. The haptic transducer device of claim 1, wherein an inner diameter of the ledge of the diaphragm is less than a diameter of the coil.

3. The haptic transducer device of claim 1, wherein an overall diameter of the diaphragm is greater than or equal to the diameter of the coil.

4. The haptic transducer device of claim 1, further comprising one or more electrical leads disposed on the diaphragm and coupled to the coil via fixed electrical connections.

5. The haptic transducer device of claim 4, wherein the fixed electrical connections are formed by one or more electrical wires respectively coupling the one or more electrical leads to the coil, and one or more channels for securely housing the respective electrical wires.

6. The haptic transducer device of claim 1, wherein a diameter of the inner edge of the suspension is less than a diameter of the coil.

7. The haptic transducer device of claim 1, wherein an overall diameter of the device is substantially equal to an overall diameter of the yoke.

8. The haptic transducer device of claim 1, wherein the yoke forms at least part of an outer housing of the device.

9. The haptic transducer device of claim 1, wherein a center of gravity of the device is substantially aligned with a central axis of the coil.

10. The haptic transducer device of claim 1, wherein a top end of the coil is attached to the sidewall of the diaphragm and a bottom end of the coil hangs between the yoke and the magnet.

11. An insole for placement in a piece of footwear, the insole comprising:
 a haptic transducer comprising a groove portion integrated into a top surface of the transducer; and
 a tongue portion comprising raised structures integrated into an underside of the insole,
 wherein the raised structures are configured for insertion into the groove portion of the haptic transducer and the groove portion is configured to receive the raised structures of the tongue portion, thereby forming a tongue and groove attachment between the insole and the haptic transducer.

12. The insole of claim 11, wherein the haptic transducer includes:
 a magnetic assembly comprising a yoke configured to form an inner cavity surrounded by an outer ledge;
 an annular suspension having an inner edge forming an open center and an outer edge coupled to the outer ledge of the yoke;
 a diaphragm disposed at least partially within the open center of the annular suspension and coupled to the inner edge of the suspension; and
 a coil coupled to a sidewall of the diaphragm and suspended within the inner cavity of the yoke, wherein the groove portion is integrated into a top surface of the diaphragm.

13. The insole of claim 12, wherein the haptic transducer further includes one or more electrical leads disposed on the diaphragm and coupled to the coil via fixed electrical connections.

14. The insole of claim 12, wherein the inner edge of the suspension is coupled to an inner ledge of the diaphragm, and an inner diameter of the inner ledge is less than a diameter of the coil.

15. The insole of claim 12, wherein an overall diameter of the haptic transducer is substantially equal to an overall diameter of the yoke.

16. The insole of claim 11, further comprising an adhesive for adhering the tongue portion to the groove portion.

17. A haptic transducer, comprising:
a housing comprising an outer ledge surrounding an inner cavity;
a diaphragm at least partially positioned within the inner cavity;
an attachment groove integrated into a top surface of the diaphragm and configured for receiving attachment structures included on a footwear insole;
an annular suspension coupled to the outer ledge of the housing and extending concentrically around the diaphragm; and
a coil coupled to the diaphragm and suspended within the inner cavity.

18. The haptic transducer of claim 17, wherein the housing includes a magnetic assembly comprising a magnet surrounded by a yoke, the yoke forming the inner cavity and comprising the outer ledge.

19. The haptic transducer of claim 17, further comprising one or more electrical leads disposed on the diaphragm and coupled to the coil via fixed electrical connections.

20. The haptic transducer of claim 17, wherein an inner edge of the suspension is coupled to an inner ledge of the diaphragm, and the inner diameter of the inner ledge is less than a diameter of the coil.

21. The haptic transducer of claim 17, wherein a center of gravity of the device is substantially aligned with a central axis of the coil.

* * * * *